(12) United States Patent
Cadel et al.

(10) Patent No.: US 9,807,370 B2
(45) Date of Patent: Oct. 31, 2017

(54) COMPACT STEREOSCOPIC PICTURE TAKING SYSTEM

(71) Applicant: THALES, Neuilly-sur-Seine (FR)

(72) Inventors: Maxime Cadel, Saint Etienne (FR); Xavier Gonon, Saint Heand (FR); Patrick Defay, L'Etrat (FR); Elvir Mujic, St Just St Rambert (FR); Gabriel Narcy, Saint Heand (FR); Catherine Hun, Saint Etienne (FR)

(73) Assignee: THALES, Neuilly sur Seine (FR)

( * ) Notice: Subject to any disclaimer, the term of this patent is extended or adjusted under 35 U.S.C. 154(b) by 550 days.

(21) Appl. No.: 14/466,813

(22) Filed: Aug. 22, 2014

(65) Prior Publication Data

US 2015/0054924 A1    Feb. 26, 2015

(30) Foreign Application Priority Data

Aug. 23, 2013   (FR) ..................................... 13 01972

(51) Int. Cl.
| | |
|---|---|
| *H04N 13/02* | (2006.01) |
| *G02B 27/10* | (2006.01) |
| *G03B 35/08* | (2006.01) |
| *G02B 15/177* | (2006.01) |
| *G03B 17/17* | (2006.01) |

(52) U.S. Cl.
CPC ....... *H04N 13/0239* (2013.01); *G02B 15/177* (2013.01); *G02B 27/1066* (2013.01); *G03B 35/08* (2013.01); *G03B 17/17* (2013.01)

(58) Field of Classification Search
CPC ...... G03B 17/17; G03B 35/08; G02B 15/177; G02B 27/1066; H04N 13/0239
See application file for complete search history.

(56) References Cited

U.S. PATENT DOCUMENTS

| | | |
|---|---|---|
| 2,360,322 A | 10/1944 | Harrison |
| 2,751,826 A | 6/1956 | Harrison |

(Continued)

FOREIGN PATENT DOCUMENTS

| | | |
|---|---|---|
| DE | 102004052253 A1 | 7/2005 |
| EP | 0969308 A2 | 1/2000 |

(Continued)

*Primary Examiner* — Sath V Perungavoor
*Assistant Examiner* — Peet Dhillon
(74) *Attorney, Agent, or Firm* — Baker & Hostetler LLP

(57) ABSTRACT

A stereoscopic picture taking systems includes a first camera having a first optical objective, and a second camera having a second optical objective, where the optical characteristics of the two objectives are substantially identical. The stereoscopic system also includes a plane semi-reflecting plate in front of the first objective and inclined by a predetermined angle on the optical axis of the first objective. The stereoscopic picture taking system also includes an optical element having a plane reflecting surface disposed at the level of the second objective and inclined by the same predetermined angle on the optical axis of the second objective such way that the main part of the optical axis of the second objective is substantially parallel to the optical axis of the first objective. This optical element can be a plane mirror or a return prism. The first objective has a plate of identical optical thickness.

5 Claims, 4 Drawing Sheets

(56) References Cited

U.S. PATENT DOCUMENTS

| | | | | |
|---|---|---|---|---|
| 3,591,262 | A | * 7/1971 | Gambs | A61B 3/14 351/214 |
| 6,335,833 | B1 | 1/2002 | Kawasaki | |
| 2006/0055834 | A1 * | 3/2006 | Tanitsu | G03B 27/42 349/5 |
| 2012/0163791 | A1 * | 6/2012 | Juri | G03B 17/561 396/327 |
| 2013/0182323 | A1 | 7/2013 | Defay et al. | |

FOREIGN PATENT DOCUMENTS

| | | |
|---|---|---|
| EP | 2549765 A1 | 1/2013 |
| GB | 740927 A | 11/1955 |
| JP | 2008292513 A | 12/2008 |

* cited by examiner

COMPACT STEREOSCOPIC PICTURE TAKING SYSTEM

CROSS-REFERENCE TO RELATED APPLICATIONS

This application claims priority to foreign French Patent Application No. FR 1301972, filed on Aug. 23, 2013, the disclosure of which is incorporated by reference in its entirety.

FIELD OF THE INVENTION

The field of the invention is that of stereoscopic picture taking systems and more particularly, those requiring two picture taking cameras.

BACKGROUND

Several cameras and objectives are necessary for taking shots of images from several different angles of view. Stereoscopic rendition may rely solely on two images, a left image and a right image or on a set of several images only one pair of which is visible to the viewer as a function of his position in front of the projection device. The latter system allows the dissemination of so-called "multiview" 3D images. The viewer moving in front of the 3D projected image sees the objects represented move as they would do in reality.

"3D" vision corresponds to an interpretation by the brain of images perceived by the two eyes so as to give a position to objects in space. The position ascribed depends on the differences between the images perceived by the viewer's two eyes. If the object is in motion, the images must be synchronous, taken at the same instant, so that the displacement of the object between two successively taken images, left and right, is not interpreted as distance information.

Stereoscopic optical solutions using just a single sensor are known from the prior art. Notably, patents DE 10 2004/052253 and EP 0 969 308 which describe stereoscopic devices comprising two input optics and a single sensor to reproduce two viewpoints will be cited. Solutions using just a single head optic are also known. Patents U.S. Pat. No. 6,335,833 and JP 2008/292513 will be cited in this category. However, most picture taking systems comprise a pair of, generally identical, channels.

In a stereoscopic system of this type, each channel or camera comprises three main sub-assemblies, namely:

A sensor casing comprising a photosensitive sensor and the associated electronic control means;

An optical objective which is generally a zoom whose field is variable. On this type of optic, three parameters at least are monitored, the focal length which determines the field, the focusing which determines the sharpness distance and the aperture which determines the illumination received by the detector;

An electromechanical device making it possible to control the values of the various parameters.

The two cameras are then mounted on a common mechanical platform which comprises inter-axis spacing and convergence adjustments. In a first embodiment of the picture taking system, the cameras are simply placed side by side, the optical axes of the objectives being in one and the same plane, the optics being able to converge slightly. Their inter-axis spacing, ever in the same plane, is also adjustable. The interpupillary distance makes it possible to tailor the degree of stereoscopy. The drawback of this embodiment is that the distance separating the two optical axes of the objectives necessarily has a minimum value related to the bulkiness of the optics and of their supports. In certain picture taking configurations, the stereoscopic effect is thus limited.

The system $S_{3D}$ represented in FIG. 1 does not have this drawback. It comprises two cameras C1 and C2 disposed perpendicularly with respect to one another and separated by a semi-reflecting plate L disposed at 45 degrees to the axes of the objectives of the cameras. In this configuration, the mechanical constraint disappears and it is possible to separate the optical axes by the desired distance at the price, however, of a photometric attenuation and of a slight optical path difference on one of the pathways due to the thickness of the semi-reflecting plate.

It is notably possible to reproduce zero inter-pupillary distances. The inter-axis spacing and the vergence between the cameras/objectives remain adjustable. This mechanical arrangement is unfortunately fairly bulky and the opto-mechanical assembly can be tricky to manipulate, particularly for portable systems.

SUMMARY OF THE INVENTION

The object of the invention is to render the latter configuration much more compact and compatible with portable use on the shoulder by a cameraman by introducing a second return plate, parallel to the first semi-reflecting plate so that the optical axes of the objectives of the cameras are parallel without introducing additional vignettings.

More precisely, the subject of the invention is a stereoscopic picture taking system comprising a first camera comprising a first optical objective and a second camera comprising a second optical objective, the optical characteristics of the first objective being substantially identical to those of the second objective, said stereoscopic picture taking system comprising a plane semi-reflecting plate disposed in front of the first objective and inclined by a determined angle on the optical axis of said first objective, characterized in that said stereoscopic picture taking system comprises at least one optical element comprising a plane reflecting surface disposed at the level of the second objective and inclined by the same determined angle on the optical axis of said second objective in such a way that the main part of the optical axis of the second objective is substantially parallel to the optical axis of the first objective.

Advantageously, the optical element is an inclined plane reflecting mirror disposed in front of the second objective.

Advantageously, the plane semi-reflecting plate and the plane reflecting mirror are disposed securely in a fixed structure, the first camera and/or the second camera comprise mechanical means of translational adjustment with respect to the other camera.

Advantageously, the plane reflecting mirror is secured to the second camera in such a way that said second camera comprising mechanical means of translational adjustment with respect to the first camera, the plane reflecting mirror moves with it.

Advantageously, the first optical objective comprises an optical sub-assembly disposed at the front of said first optical objective and comprising a thick glass plate, the optical element being a return prism comprising said plane reflecting surface, the optical thickness of said return prism being identical to that of the thick glass plate.

Advantageously, the two optical sub-assemblies have optical powers.

Advantageously, the first optical objective and the second optical objective are zooms with convergent-divergent optical variator.

Advantageously, the sub-assemblies situated at the front of the objectives comprise movable groups ensuring focusing as a function of distance of the scene to be observed.

Advantageously, in the normal position of use, the optical axes of the first optical objective and of the second optical objective are in a substantially vertical plane.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
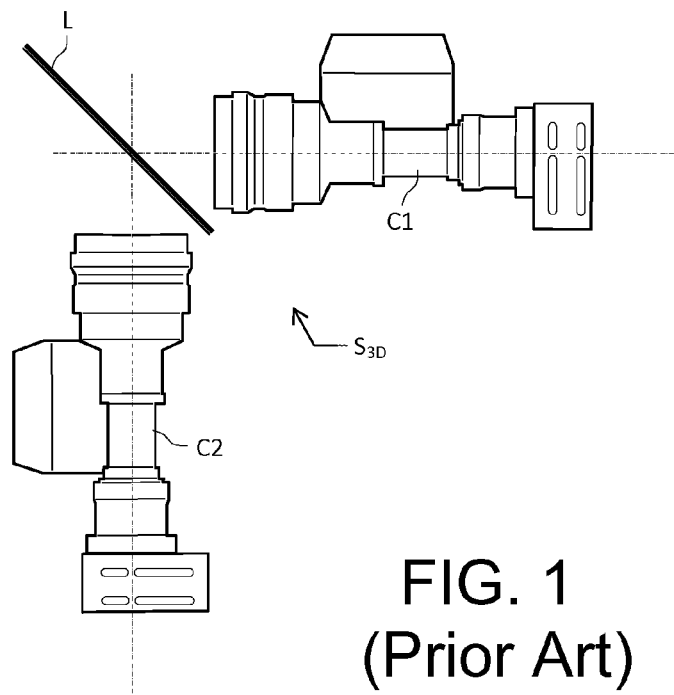
FIG. 1 represents a stereoscopic picture taking system in a configuration with two cameras according to the prior art.
Figure 2:
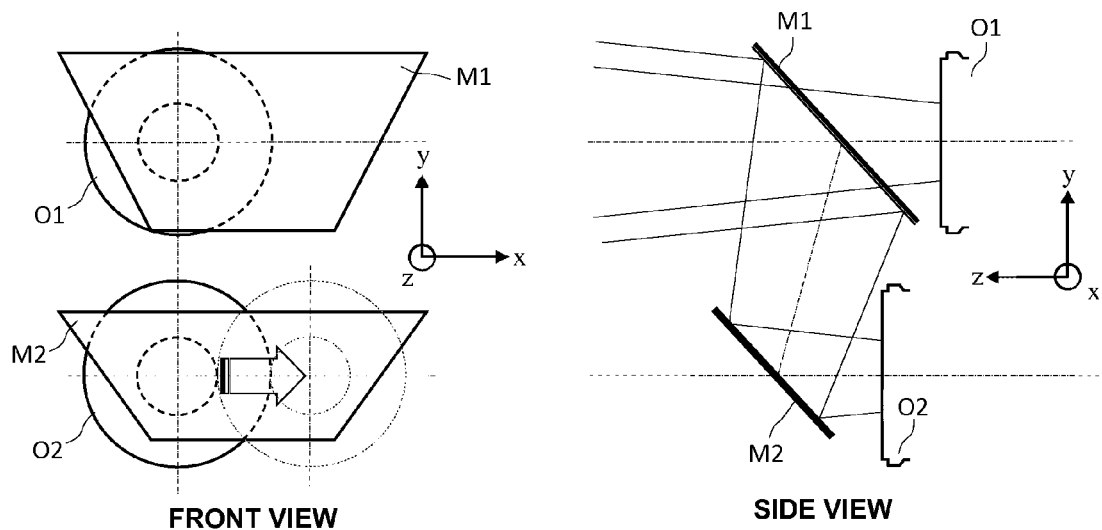
FIG. 2 represents a first configuration with mirror of a stereoscopic picture taking system according to the invention.

By way of first example, FIG. 2 represents a first configuration with mirror of a stereoscopic picture taking system according to the invention. This FIG. 2 comprises an end-on view and a partial side view which are referenced in a frame of reference (x, y, z). In these views, the mirrors have been represented as have the front part of the optical objectives. The light rays delimiting the fields of the cameras are represented by slender lines in the side view of this FIG. 2 and in the subsequent figures.

In this FIG. 2, the stereoscopic picture taking system comprises a first camera comprising a first optical objective O1 and a second camera comprising a second optical objective O2, the optical characteristics of the first objective being substantially identical to those of the second objective. Generally, these objectives are zooms. The optical axes of these two objectives are mutually parallel and parallel to the z axis.

The parallelism of the two optical axes is obtained by means of an optical assembly comprising a plane semi-reflecting plate M1 disposed in front of the first objective and inclined by a determined angle on the optical axis of said first objective and a reflecting plane mirror M2 disposed at the level of the second objective and inclined by the same determined angle on the optical axis of the second objective. The angle of inclination is about 45 degrees. This disposition of the semi-reflecting plate and of the mirror makes it possible to preserve an identical image orientation on the two optical pathways. It produces neither image rotation nor inversion between the two picture taking pathways.

Thus, a part of the light rays arising from an object whose stereoscopic image it is sought to produce passes directly, by transmission, through the plane semi-reflecting plate M1 and is focused by the first objective. The second part is reflected successively by the plane semi-reflecting plate M1 and the mirror M2, and is then focused by the second optical objective.

Figure 3:
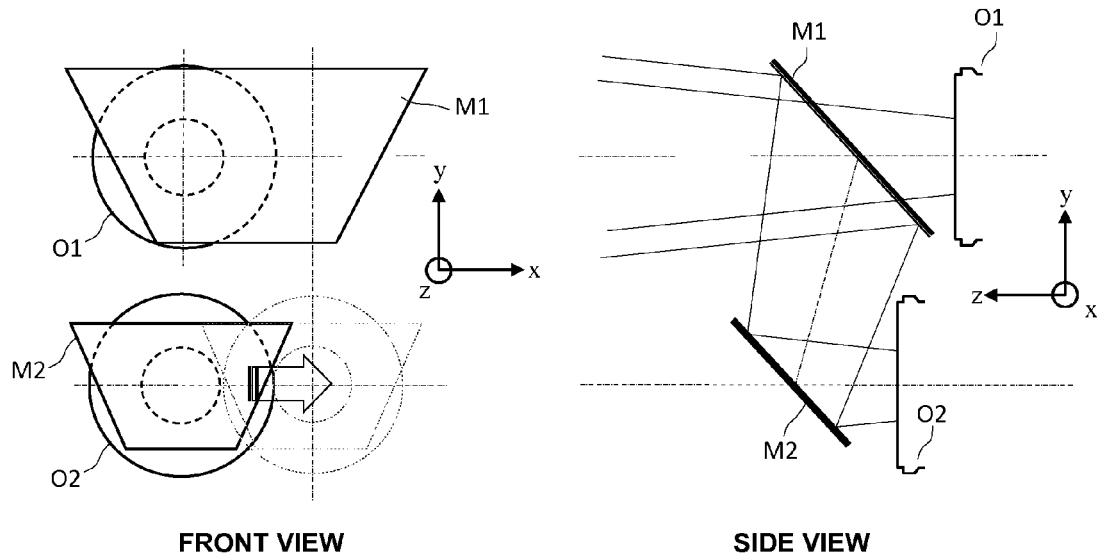
FIG. 3 represents a first variant of this first configuration of a stereoscopic picture taking system according to the invention.
Figure 4:
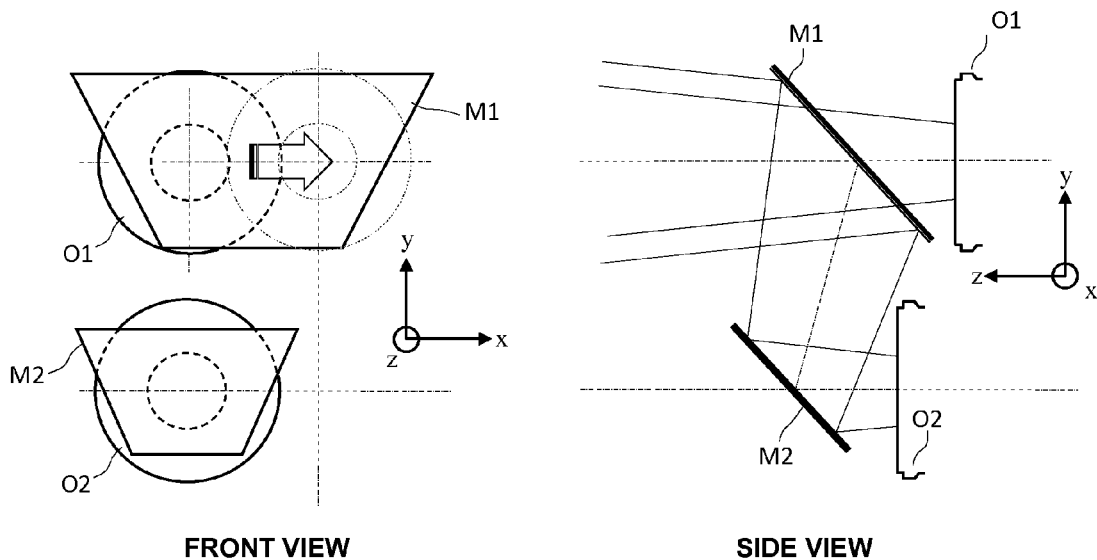
FIG. 4 represents a second variant of this first configuration of a stereoscopic picture taking system according to the invention.

The second camera with its objective O2 is mounted on a translational platen making it possible to vary the interpupillary distance between the optical axes of the two objectives O1 and O2 by a determined value along the x axis. The displacements in FIGS. 2, 3 and 4 are represented by a transparent arrow. It should be noted that it is possible to effect this displacement along the y axis. But this configuration leads to significant bulk and is more penalizing. This value of interpupillary distance may be zero. Optionally, other rotational platens make it possible to adjust the orientation of one camera with respect to the other in terms of attitude and convergence. The assembly consisting of the plane semi-reflecting plate M1 and the mirror M2 is mounted in a fixed structure without adjustments so as to minimize its bulk and its mass.

The semi-reflecting plate M1 and the mirror M2 are disposed in such a way that the distances between the object and the first objective on the one hand and the object and the second objective are substantially equivalent in the nominal position. The positions and the dimensions of the mirrors M1 and M2, the vertical distance separating them and the angle of inclination are optimized so that no significant vignetting is introduced whatever the focal length of the zoom and the horizontal interpupillary offset. This optimization forms part of the general knowledge of the person skilled in the art. As seen in the end-on view of FIG. 2, the semi-reflecting plate and the mirror have substantially trapezoidal shapes.

In this first configuration, the mirrors are fixed and of significant dimensions. It is possible to reduce the bulkiness of the system by binding the mirror M2 securely to the second camera. This first variant embodiment is illustrated in FIG. 3. In this configuration, when the second camera is displaced with its objective O2 mounted on its translational platen, the mirror M2 is also displaced. The dimensions of the mirror M2 are thus significantly reduced but at the price of greater mechanical complexity of the second camera.

Finally, a second variant embodiment is illustrated in FIG. 4. In this configuration, the semi-reflecting plate M1 and the mirror M2 are fixed, the second camera is also fixed. The first camera with its objective O1 is mounted on a translational platen. In the latter configuration, the mirrors are of minimum size and mounted in a fixed structure.

The previous configurations may require mirrors and semi-reflecting plates of significant dimensions, especially if the fields and the pupils are of large dimensions. Hence, it is possible to implement a second type of optical configuration if the arrangement of the optical objective lends itself thereto. In this configuration, the mirror M2 is replaced with a return prism forming part of the optical combination of the objective O2 and the objective O1 comprises a thick glass plate, the optical thickness of the return prism being identical to that of the thick glass plate.

By way of nonlimiting example, this second configuration of the optical system is illustrated in FIGS. 5 to 8 in the case of an optical zoom. The objectives O1 and O2 of the two cameras comprise six lenses or groups of lenses, denoted from L1 to L6. The objective O1 comprises a thick plate E and the objective O2 comprises a prism P. The objectives O1 and O2 are disposed in front of photosensitive sensors D1 and D2. The light rays delimiting the fields of the cameras are represented by slender lines in these various figures.

Figure 5:
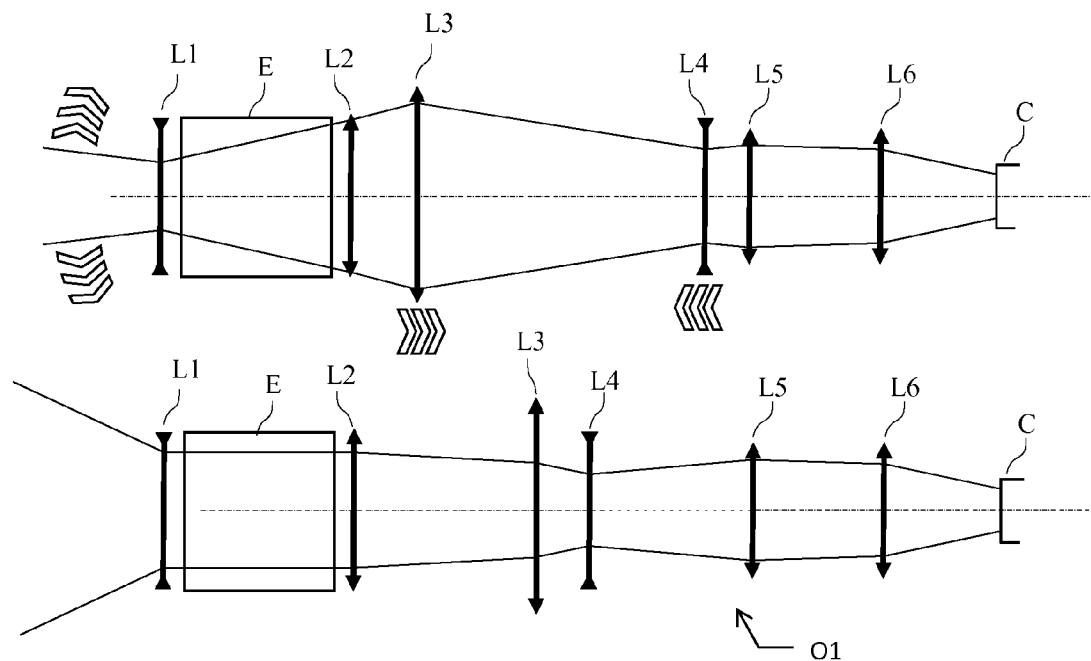
FIG. 5 represents the operating principle of the first objective of a second configuration with prism according to the invention.

Each zoom O1 and O2 comprises a first assembly situated at the front comprising the groups of lenses L1 and L2, a second fixed assembly situated at the rear of the zoom comprising the groups of lenses L5 and L6 and a third assembly called a variator comprising the movable groups L3 and L4. In this example, the variator is of the convergent-divergent type. It is arranged in such a way that, when the optical groups L3 and L4 are brought closer together according to a certain law, the field and therefore the focal length of the zoom varies in determined proportions defining the zoom ratio, the focusing remaining unchanged. FIG. 5 represents this change of focal length. In this figure, the induced changes in position of the groups and field are represented by triplets of chevrons.

The assembly situated at the front advantageously comprises lenses that are movable along their optical axis so as to be able to focus at finite distance and preserve this focusing whatever the chosen focal length value of the zoom.

Figure 6:
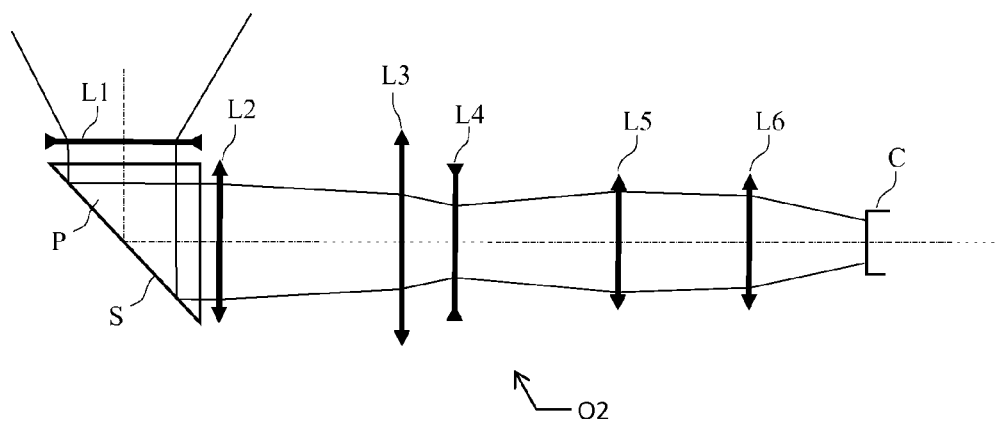
FIG. 6 represents the operating principle of the second objective of said second configuration with prism.

The plate E and the prism P have the same input faces, the same optical thickness and are made from the same material. They are therefore optically identical. As seen in FIG. 6, the prism P comprises a reflecting surface S which has the same function as the mirror M2 of the previous configuration. In a variant, this face S can operate according to a total internal reflection regime.

Figure 7:
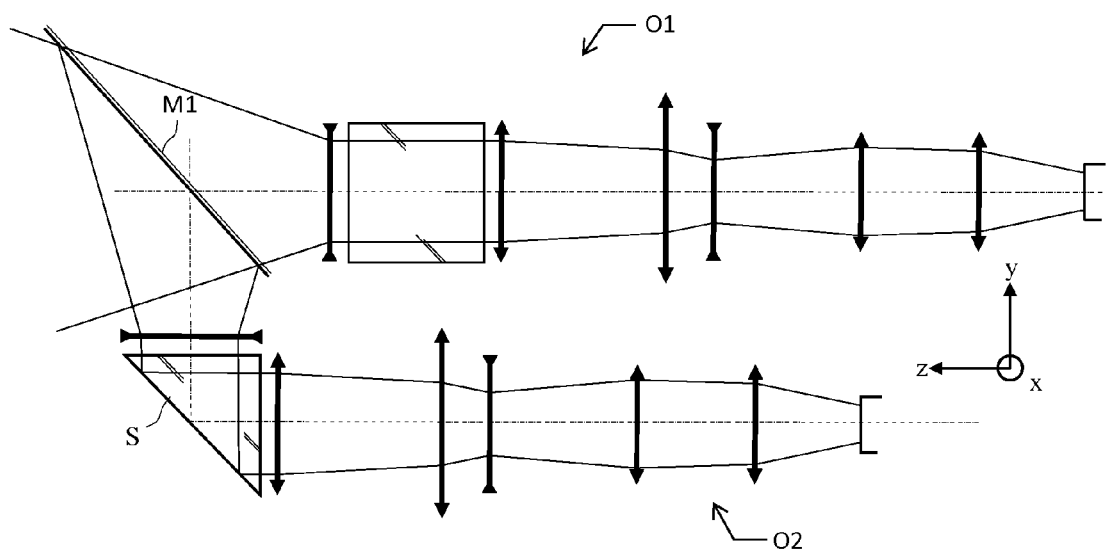
FIG. 7 represents the assemblage of the first objective and of the second objective of said second configuration with prism.

The mounting of the two objectives O1 and O2 in a stereoscopic system is represented in FIG. 7. As in the previous configuration, the two objectives are separated by a semi-reflecting plate M1. The inclinations of this semi-reflecting plate M1 and of the reflecting surface S are identical.

Figure 8:
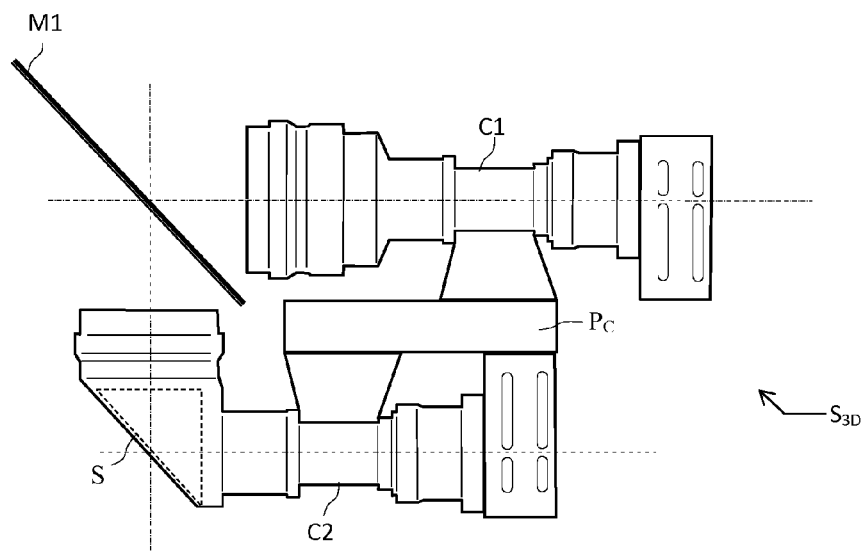
FIG. 8 represents the whole assembly of the second configuration with prism of a stereoscopic picture taking system.

The final mounting of the two cameras C1 and C2 comprising the objectives O1 and O2 is represented in FIG. 8. The two cameras are mounted head-to-tail on a common platform $P_C$ which comprises the various adjustments, notably the convergence adjustments. The whole assembly forms the stereoscopic system $S_{3D}$.

This technical solution yields a more compact stereoscopic system with the constraint of using two objectives whose optical arrangement is slightly different.

What is claimed is:

1. A stereoscopic picture taking system, comprising:
a first camera comprising a first optical objective;
a second camera comprising a second optical objective, wherein optical characteristics of the first optical objective are substantially identical to optical characteristics of the second optical objective; and
a plane semi-reflecting plate disposed in front of the first optical objective and inclined by a predetermined angle on an optical axis of said first optical objective,
wherein the first optical objective comprises, in the following order, a first divergent group of lenses, a thick glass plate, a first convergent group of lenses, a first variator comprising two movable groups of lenses, and a first fixed assembly comprising two group of lenses,
wherein the second optical objective comprises, in the following order, a second divergent group of lenses, a return prism comprising a plane reflecting surface, a second convergent group of lenses, a second variator comprising two movable groups of lenses, and a second fixed assembly comprising two group of lenses, the second divergent group of lenses being identical to the first divergent group of lenses, the second convergent group of lenses being identical to the first convergent group of lenses, the second variator being identical to the first variator, and the second fixed assembly being identical to the first fixed assembly, and
wherein an optical thickness of said return prism being identical to an optical thickness of the thick glass plate, said plane reflecting surface being inclined substantially by the predetermined angle on an optical axis of said second optical objective such that a main part of the optical axis of the second optical objective is substantially parallel to the optical axis of the first optical objective.

2. The stereoscopic picture taking system of claim 1, wherein the first and second variators have optical powers.

3. The stereoscopic picture taking system of claim 1, wherein the first and second optical objectives are zooms, and the first and second variators are convergent-divergent optical variators.

4. The stereoscopic picture taking system of claim 1, wherein the first and second variators ensure focusing as a function of distance of an observed scene.

5. The stereoscopic picture taking system of claim 1, wherein, in a normal position of use, the optical axes of the first and second optical objectives are in a substantially vertical plane.

* * * * *